United States Patent [19]

Hauck et al.

[11] 3,787,816

[45] Jan. 22, 1974

[54] MULTIPROCESSING SYSTEM HAVING MEANS FOR AUTOMATIC RESOURCE MANAGEMENT

[75] Inventors: Erwin A. Hauck, Arcadia; Don M. Lyle, Huntington Beach; James E. Wollum, Glendora, all of Calif.

[73] Assignee: Burroughs Corporation, Detroit, Mich.

[22] Filed: May 12, 1972

[21] Appl. No.: 252,875

[52] U.S. Cl. .......................... 340/172.5, 235/153 AK
[51] Int. Cl. .......................... G06f 11/06
[58] Field of Search. 340/172.5, 146.1; 235/153 AK

[56] References Cited

UNITED STATES PATENTS

| | | | |
|---|---|---|---|
| 3,386,082 | 5/1968 | Stafford et al. | 340/172.5 |
| 3,413,613 | 11/1968 | Bahrs et al. | 340/172.5 |
| 3,421,150 | 1/1969 | Quosig et al. | 340/172.5 |
| 3,226,689 | 12/1965 | Amdahl et al. | 340/172.5 |
| 3,551,892 | 12/1970 | Driscoll | 340/172.5 |
| 3,303,474 | 2/1967 | Moore et al. | 340/172.5 |
| 3,480,914 | 11/1969 | Schlaeppl | 340/172.5 |
| 3,641,505 | 2/1972 | Artz et al. | 340/172.5 |

*Primary Examiner*—Paul J. Henon
*Assistant Examiner*—Mark Edward Nusbaum
*Attorney, Agent, or Firm*—Mervyn L. Young

[57] ABSTRACT

The disclosure relates to a multiprocessing system which may be reconfigured in a controlled manner to redesignate the functions assigned to particular similar units so as to provide continuous data processing capabilities. In certain circumstances, a failed unit or group of such units can be isolated from the system. Whenever a malfunction is sensed which requires corrective measures, the system operation is halted, the different operational units of each of the processing groups which make up the multiprocessing system are redesignated for different functional tasks, a new and reliable copy of the master control program is loaded into main memory and the system operation is reinitiated

10 Claims, 8 Drawing Figures

MULTIPROCESSING SYSTEM HAVING MEANS FOR AUTOMATIC RESOURCE MANAGEMENT

RELATED U.S. PATENT APPLICATIONS

U.S. Pat. applications directly or indirectly related to the subject application are the following:

Ser. No. 252,874 filed May 12, 1972, by J. E. Wollum et al., and titled "A Multiprocessing System Having Means for Dynamic Redesignation of Unit Functions,"

Ser. No. 252,903 filed May 12, 1972, by E. A. Hauck et al., and titled "A Multiprocessing System Having Means for Partitioning into Independent Processing Subsystems,"

Ser. No. 252,890 filed May 12, 1972, by R. S. Sharp et al., and titled "A Multiprocessing System Having Means for Permissive Coupling of Different Subsystems."

BACKGROUND OF INVENTION

1. Field of Invention

This invention relates to a multiprocessing system adapted to provide a high degree of data processing services even in the event of disabling failures and more particularly, this invention relates to a multiprocessing system which may be reconfigured in a controlled manner to isolate either a failed unit or a group of such units while remaining portions of the system continue to provide data processing capabilities.

Description of the Prior Art

An increasing number of areas of activity occur in which dependable data processing services are essential. Such areas of activity include traffic control, control of power transmission over large power grids or networks, and so forth. Such activities affect a large number of people and large geographical areas. Thus, it will be appreciated that large numbers of people could be inconvenienced if not endangered should an information processing system by inoperative during the time of peak traffic in a case of traffic control or flight control or during a power failure in the case of control of power transmission, caused by the malfunction of a particular unit of the information processing system. Even in the case of banking, reservation systems and other systems involving commercial transactions, it is apparent that a large number of people could be inconvenienced due to delay in such transactions caused by the information processing system being unavailable due to a failure of some particular unit.

In order to provide greater dependability in on-line systems, such systems conventionally have been provided with back-up units which could be used to replace a failed unit. Where a high degree of dependability is mandatory, dual systems have been provided so that if an uncorrectable error were detected in the primary system, the results from the alternate system would then be employed. The alternate system then became the primary system until such time as maintenance could be performed on the initial primary system. Of course, with the duplication and redundancy of units in the system, the expense of the system increased proportionately.

Aside from the reliability-dependability problem, multiprocessing systems have been created in the past to provide increased data processing capabilities. Such multiprocessing systems include a plurality of processors operating independently of one another but under the control of a common operating system which supervises a large number of job assignments and allocates common resources. The increased data processing capabilities of such a multiprocessing system are provided through an increased number of main memory units, peripheral devices, I/O controllers, back-up storage units and so forth. Thus, such a multiprocessing system comprises a number of additional or redundant units, not for the purpose of reliability or dependability, but rather for the provision of additional data processing capabilities. Such a system could be adapted to provide a higher degree of dependability with the addition of some control circuitry but without the requirement of more redundant units.

With such a multiprocessing system, additional units such as processors, memory units and peripheral devices may be added to increase the data processing capabilities of the system. Conversely, should a respective unit fail in a manner requiring extensive maintenance, that unit can be removed from the system with only partial reduction of the systems' capabilities. However, in certain situations, it is desirable to diagnose and repair a unit without physically removing the unit from the system. In this situation, it is also desirable to have other units of the system available for the diagnostic and maintenance procedures. It is then important, under the circumstances, to configure the system in a manner to ensure continued processing capabilities at an acceptable level while the diagnostic and maintenance procedures are being run.

Accordingly, there is a need for a multiprocessing system provided with appropriate means for the management of its resources in a controlled manner, to accommodate the various programming tasks and jobs that in turn require different data processing capabilities.

It is then an object of the present invention to provide a multiprocessing system the units of which may be reconfigured in a controlled manner to remedy the effect of a malfunction in any particular unit of the system.

It is another object of the present invention to provide a multiprocessing system wherein the functional tasks of different like units can be redesignated in response to different unit malfunctions.

It is still another object of the present invention to provide a multiprocessing system wherein an individual unit may be isolated from the system or wherein a group of different units may be isolated in the system for maintenance and diagnostic procedures while continuing data processing continues at an acceptable level.

It is still another object of the present invention to provide a multiprocessing system that may be partitioned into separate subsystems to accommodate different processing tasks.

SUMMARY OF THE INVENTION

In order to accomplish the above-described objects, the system embodying the present invention is adapted to sense malfunctions in the system and to signal for a reconfiguration of the units of the various processing groups which make up the multiprocessing system. This reconfiguration is more aptly described as a redesignation of the functional task of different like units. That is to say, different similar physical units from the same or different processing groups can be redesignated to carry out different functional tasks or they can be disengaged from the system. In order to maintain continuous processing capabilities, the system operation is first halted, the reconfiguration or redesignation is accomplished, the system operations is reinitiated and a new copy of the master control program is loaded into the main memory unit.

Features of the present invention, then, reside in the system along with the methods employed by that system whereby a malfunction is sensed in any units of the various processing groups which make up the multiprocessing system. The current operation of the system is halted, the signals are transmitted to the respective processing groups to redesignate the functions of similar like units from among the respective groups, the system operation is reinitiated and a new copy of the master control program is loaded into the main memory.

BRIEF DESCRIPTION OF THE DRAWINGS

The above objects, advantages and features of the present invention will become more readily apparent from a review of the following specification in relation with the drawings where.

GENERAL DESCRIPTION OF THE SYSTEM

Figure 1:
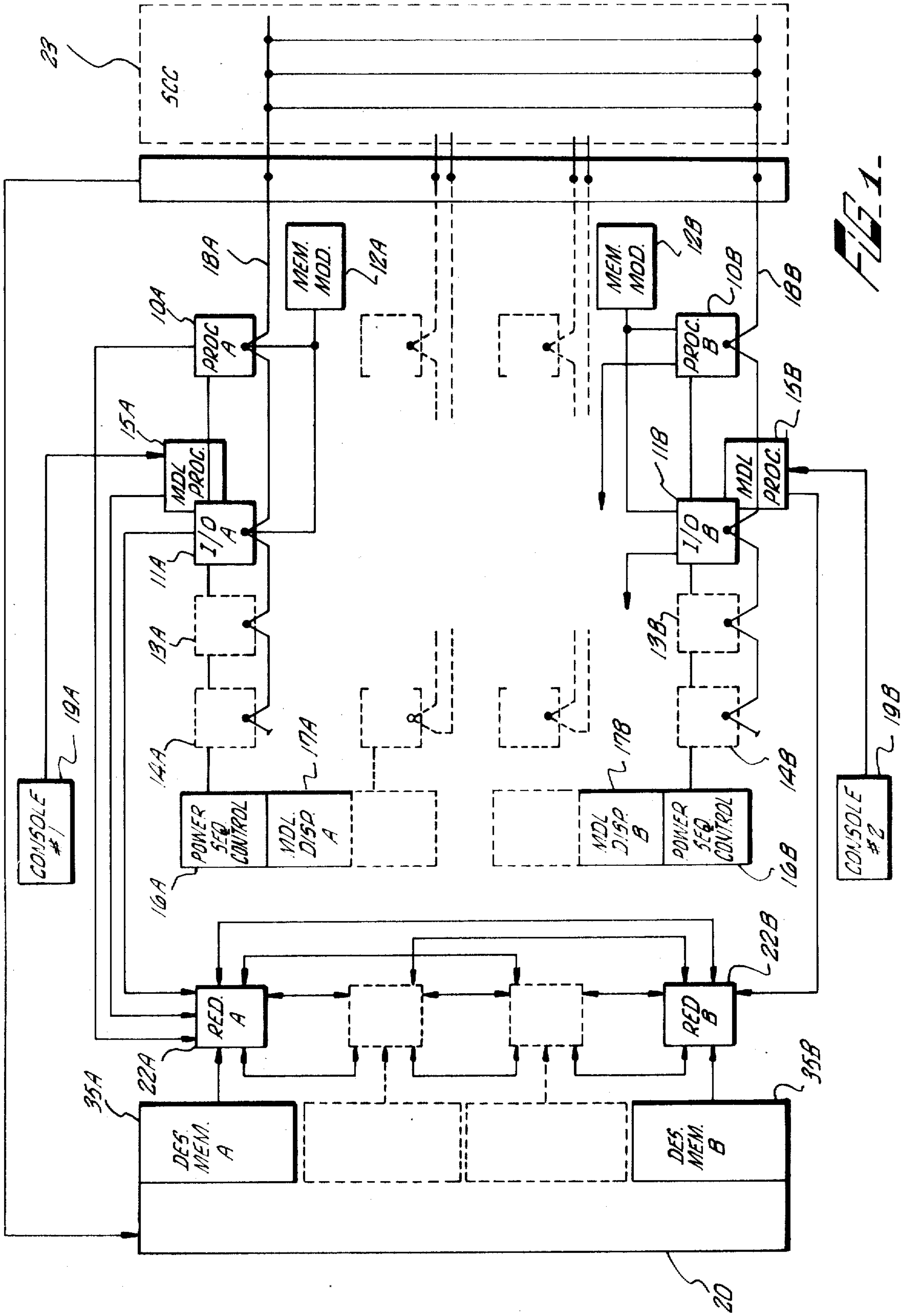
FIG. 1 is a schematic drawing illustrating a multiprocessing system employing the present invention.

The system embodying the present invention is a multiprocessing system which is provided with the necessary means for management of its resources at both the functional unit and subsystem levels. This system is particularly adapted for continuous on-line or real time operation which may be endangered by failures.

The system is adapted to respond to malfunctions by appropriately required reconfiguration of units within each of the various processing groups which form the entire system. Reconfiguration within each group may result in the exclusion of a failed unit from its corresponding group. However, reconfiguration may be defined generally as the redesignation of functions for particular similar units. Associated with each reconfiguration operation is a halting of the system, a loading into main memory of a new copy of the master control program and the task or tasks that were being performed at the time of failure are restarted, or at least a portion of those tasks are rerun to obtain the required continuous operation of the system. In addition, the various processing groups of the system can be partitioned into separate and independent subsystems as may be desired by the system operator.

A. System Description

The present invention relates to a system having both automatic and manual capabilities of reconfiguration. To this end, this invention is embodied in a multiprocessing system having two or more processors, I/O control units, and so forth to form the above described two or more processing groups. The groups are served by a plurality of backup memories. The system, through its reconfiguration capability, may be configured into separate processing groups, into various combinations of such groups or as a single multiprocessing system. Dynamic and manual reconfiguration management of this system is provided through the addition of three unit types: a reconfiguration control unit, a scan bus configuration unit and a redesignator unit.

The reconfiguration control unit includes the provision for the control of hardware resources. This unit provides the capability to isolate a failing system component or subsystem to allow for effective maintenance and repair procedures. When failures are detected and diagnosed, the system operation is halted and the faulty portion of the system is disconnected by input to the reconfiguration control unit. A load of software control procedures may be required to bring the remaining system to an operational status with some reduction in performance but with performance maintained at acceptable levels.

The scan bus configuration unit allows for convenient reconfiguration of subsystems only. This unit provides the capability to partition a control bus that is used by the entire system. This control bus is referred to as the scan bus. The respective scan buses lace through individual units comprising a processing group in order to supply control information from the processor and a number of such buses then converge at the scan bus configuration unit. Thus, a processing group may be isolated for maintenance and repair and the remainder of the system may be returned to on-line operation. The scan bus configuration is reported to the reconfiguration control unit by configuration status signals.

The redesignator unit initiates those tasks which are necessary for dynamic system reconfiguration. Such a redesignator unit is provided for each processing group in the data processing system. Each processing group includes a processing unit, a memory module unit, and an I/0 control unit. Each redesignator unit is interconnected to the redesignator units of the other groups so as to effect a required reconfiguration of the system under the control of signals received from the various groups. The redesignator units are connected to the reconfiguration control unit from which additional signals are received to effect the required reconfiguration. Generally, signals from the reconfiguration control unit are derived from a designation memory which is a part of that unit. The information stored in the designation memory, then represent the various system designation parameters of the subsystem groups (or sets) for the reconfiguration capabilities of the system. The various sets of reconfiguration control signals are selected from the designation memory in response to conditions sensed in the system by the various redesignator units.

The major tasks performed by various units are ordered by a central processor by means of command signals which are transmitted on the scan bus. Such scan bus command signals go to all units to which the scan bus is linked. However, when a central processor issues a scan bus command, the command is always intended for one and only one receiving unit. Accordingly, several conductors in the scan bus are used for carrying signals that represent the identification of a unit to which the particular scan bus command is addressed. The functions or tasks to be performed by a particular unit depend on the command signals to which that unit responds. The unit's identification can be changed by redesignating that unit.

The unit's identification is transmitted to the unit by cables separate from the scan bus itself and is, then a redesignation of the functions or tasks to be performed by that unit. In the present system the function designation or identification of each unit is specified by the reconfiguration control signals stored in the designation memory of the reconfiguration control unit described above.

There are two basic classes of failures which will result in dynamic reconfiguration. One such class of failures includes those which are sensed by hardware or circuitry and the other class is that class of failures which are sensed under software control or by a combination or program and circuit control. For example, a type of failures which are sensed by circuit control include power failures in the processing groups. When the system is running as a joint system, a power failure in a particular group will cause a dynamic reconfiguration which removes that group from the system.

Another type of failure sensed by circuit control is that of a processor recursive interrupt. Such an interrupt calls upon a procedure which inherently recalls itself. In this situation, this condition is sensed by appropriate circuitry which signals a redesignator unit that in turns halts the processor along with other operating units and causes a dynamic reconfiguration of the system to remove that processor.

An example of failures which are sensed under program control include the testing of a load control counter in each I/0 control to determine the number of successive unsuccessful operations (called dynamic halt/load) which occurred under program control. This counter is incremented whenever a dynamic halt/load operation is executed with that particular I/0 control unit. The counter may be decremented under software control if a load operation is successful. When the number of unsuccessful operations reaches a predefined count, then a dynamic reconfiguration will occur.

Four distinct actions take place during a dynamic reconfiguration cycle. First, the reconfiguration is delayed until the current I/0 operations are finished. Second, the reconfiguration is effected. Third, the remaining portion of the system is selectively cleared, and fourth, a new load cycle is initiated.

B. Functional Description

Before generally describing the function of the present system, certain procedures will be defined as they are often referred to in this specification.

A halt/load procedure is one where the system operation is halted and the master control program (MCP) is loaded from disk into the first portion of that memory module designated as module "zero." This procedure is effective only if the MCP and a related directory of reliable files are recoverable from the disk system.

A cool start procedure is one where utility program is loaded into memory, which program controls the loading of a specified MCP into a disk file. After the MCP is on disk, an automatic halt/load procedure is initiated. The cool start procedure is effective only if a directory of reliable files is recoverable from disk.

A cold start procedure is one where a utility program is loaded into memory which program controls the loading of the MCP from tape to disk. Any existing directory of files is cleared and a pseudo directory is established. An automatic halt-load procedure is then initiated.

The system of the present invention is designed to provide four levels of operations to accommodate failure recovery depending upon the type of error or fault encountered in the system. This system is a multiprocessing system under the overall control of a master control program (MCP). Such a master control program is described in Burroughs B 6700 Master Control Program Information Manual, copyrighted 1970, by Burroughs Corporation, Detroit, Michigan.

The first level of operation is that of confidence testing of the various physical units of the system through the execution of an on-line confidence test routine. At this level, the maintenance information retained in various system logs is interrogated by the MCP on a periodic basis to detect abnormally high retry rates of data transfer to or from particular units such as peripheral devices. When such an abnormally high retry rate is detected, a system log retrieval message is generated to request permission of the system to run a confidence routine on the suspect unit or system resource. The computer operator has the option of granting or denying this request. A confidence test then confirms or denies a suspected malfunction in the system resource by sending a message to a maintenance log. The computer operator, then has the option of deactivating or keeping the suspect resource as a part of the system although the MCP will prevent the removal of those resources necessary to maintain a minimum operational configuration. The system of the present invention will continue to operate in this level of operation as long as the multiprocessing system's minimum operational configuration is available and the MCP remains in control of that system. The system will be changed to a level two operational state when there is a MCP loss of task control.

There are two types of level two operational states provided in the system of the present invention. One type is the provision of on-line dynamic halt/load operation under control of the MCP. The second type is a halt/load operation with an interrelated dynamic reconfiguration initiated by a sensed failure and carried out by hardware control devices. The halt/load operation of the first type of level two operation is one that is initiated whenever an irrecoverable fault is detected by software.

The on-line dynamic halt/load under control of MCP (first type of level two operation) is initiated automatically where possible by the MCP when faults occur that cause circumstances to prevail from which the MCP cannot recover. The successful completion of this procedure will provide the necessary system log retrieval message to be displayed at the computer console. Upon successful completion of the procedure, the system is returned to the level one operational state. However, when a predefined number of successive unsuccessful dynamic halt/load operations on the system occur, the system then will be changed to the second type of level two operational state.

The second type of level two operational state provides a dynamic reconfiguration of the system followed by a halt/load operation which are initiated on the system under hardware control without operator intervention. Prior to the dynamic reconfiguration, time is allowed for I/0 operations and processing to come to an orderly halt. After dynamic reconfiguration, the subsequent load procedure is initiated and if successful, the system is returned to the first type of level two operational state as described above. The number of times this system can enter into the second type of level two operational state is controlled by hardware. After a given number of successive recovery attempts have been made, the system is then transferred to the level three operational state.

The level three operational state requires the operator to assist system recovery by manually partitioning or reconfiguring the system. The system will be maintained in the level three operational state so long as the system has been partitioned. The system can return to the level one operational state only when the entire system is capable of operation. A fourth level of operational state requires manual intervention for diagnostics and isolation of the faulting component of the system.

DETAILED DESCRIPTION OF THE SYSTEM

A general purpose multiprocessing system of the type embodying the present invention will now be described with reference to FIG. 1. As illustrated therein, such a system includes two or more processors 10A, 10B which along with two or more I/0 control units 11A, 11B are coupled to two or more memory modules 12A, 12B. The I/0 control units are in general the I/0 control and communication link with the peripheral units of the system. In addition, the system may include two or more data communication processors 13A, 13B which communicate with remote terminals and also disk file optimizers 14A, 14B which determines the sequence of data transfers to disk files that are employed as back-up storages. Such disk file optimizers may be of the type described in the Balakian et al. U.S. Pat. No. 3,623,006, which patent issued Nov. 21, 1971. The units thus described are adapted for operation as two separate processing groups and have either A or B in their unit designations to indicate whether they belong to group A or group B. As indicated in FIG. 1 additional processing groups may be provided as required.

The respective units in each of the processing groups are coupled together by individual scan bus trunks 18A, 18B which in turn may be interconnected by way of scan bus configuration unit 23 to provide communication between processing groups in a manner which will be more thoroughly described below.

In addition, each processing group is provided with a maintenance and diagnostic logic processor 15A, 15B and a maintenance and diagnostic logic display unit 17A, 17B. Such maintenance and diagnostic logic processors may be of the type described in the Kwan et al. U.S. Pat. No. 3,576,541, which patent issued Apr. 27, 1971, and such display units may be of the type described in the Brown, Jr., U.S. Pat. No. 3,505,650, which patent issued Apr. 7, 1970. Operator communication is accommodated by consoles 19A, 19B.

To implement the invention of the present application, each of the processing groups is provided with a group control unit 22A, 22B which, in essence, is the group representative for configuration communication between groups and which includes the redesignator unit described above. As was indicated above, the redesignator units receive control signals from a designation memory which is contained in reconfiguration control unit 20.

As was indicated above in the general description of the system, the partitioning capabilities of the system scan bus are provided by the scan bus configuration unit 23 which is a passive supervisor of the system and places constraints upon the manner in which the various groups can be interconnected. The reconfiguration control unit 20 is the active supervisor of the system configuration and the actual reconfiguration operations are implemented in conjunction with the respective group control units 22A, 22B which not only provide the appropriate interconnections between groups as required but which also sense various failures in the respective groups for which reconfiguration may be required.

Before describing the various configurations that may be dynamically obtained, a particular type of system partitioning and reconfiguration will now be described in relation to FIG. 2. As illustrated therein, the system is similar to that illustrated in FIG. 1 and corresponding units in the two figures are designated by the same numeral. The system in FIG. 2 comprises but two processing groups that may be operated either separately or jointly. In this embodiment the two processing groups are interconnected in that either of the processors 10A, 10B and I/0 control units 11A, 11B can access any of the memory modules 12A, 12B. Furthermore, any of the remote terminals can be coupled by clusters 30A, 30B to either of the data communication processors 13A, 13B. Also the respective disk controls 28A, 28B are interconnected by disk exchange unit 32 and the tape controls 29A, 29B are interconnected by way of tape exchange unit 31. Multiple paths to disk are of significance as it is the disk files which store the master control program (MCP). Thus, should an error occur in the transfer of one of the copies of the MCP from a particular disk file unit, that error may be corrected by utilizing the other copy of the MCP from the other disk file.

Figure 2:
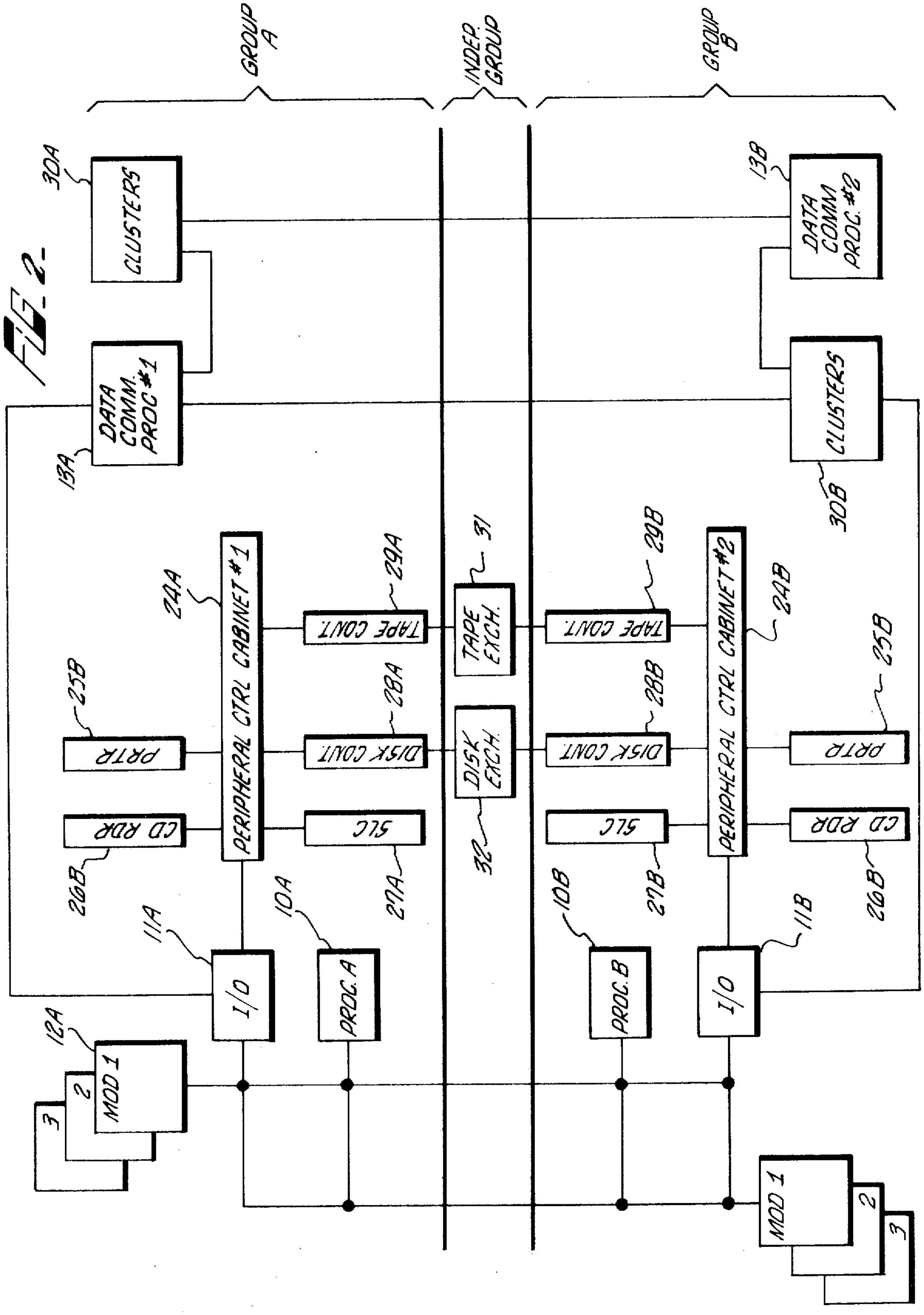
FIG. 2 is a schematic diagram illustrating a manner in which the system of FIG. 1 may be partitioned into separate processing groups.

The system of FIG. 2 may be operated in a true multiprocessing mode such as described in Anderson, et al. U.S. Pat. No. 3,419,849. The system of FIG. 2 may also be reconfigured into two processing systems, one of which may be designated the primary system and the other group being a secondary system or a back-up system. Should a failure occur in the primary system, then the secondary system may be employed as the primary system. Such reconfiguration may be achieved with the dynamic reconfiguration capabilities of the present invention or it can be manually selected under the control of a switch at the operator's console.

As was indicated above, the configuration of the system is under the passive supervision of the scan bus configuration unit 23 of FIG. 1 and under the active supervision of the reconfiguration control unit 20 which effects the appropriate different configurations by transmitting control signals to the various redesignator units 22 which are the individual group representatives for each of the subsystem groups. It was further indicated above that the various reconfigurations were in response to distress or failure signals sensed by the redesignator units.

The various elements of the reconfiguration control unit 20 of FIG. 1 will now be described in relation to FIG. 3. As illustrated therein, reconfiguration control unit 20 includes designation memory 35 which is a series of storage locations to hold various sets of control signals representative of the different types of desirable designation options. In a preferred embodiment, designation memory 35 is a programmable read only memory, the elements of which may be changed by the system's operator. The different locations of this memory are addressed by stepping switch 36 that in turn responds to stepping signals from the various redesignator units 22A, 22B and 22C. The stepping signals received from the redesignator units call for the appropriate new system configuration in response to distress or failure signals sensed by the redesignator units.

The respective redesignator units can also be activated to call for a new system configuration by signals sent from operator console 19. Designation memory 35 could of course be a random access memory addressable by other units in the system or it could be a read only memory wired in circuitry. In its preferred embodiment, the designation memory is a programmable read only memory.

Figure 6:
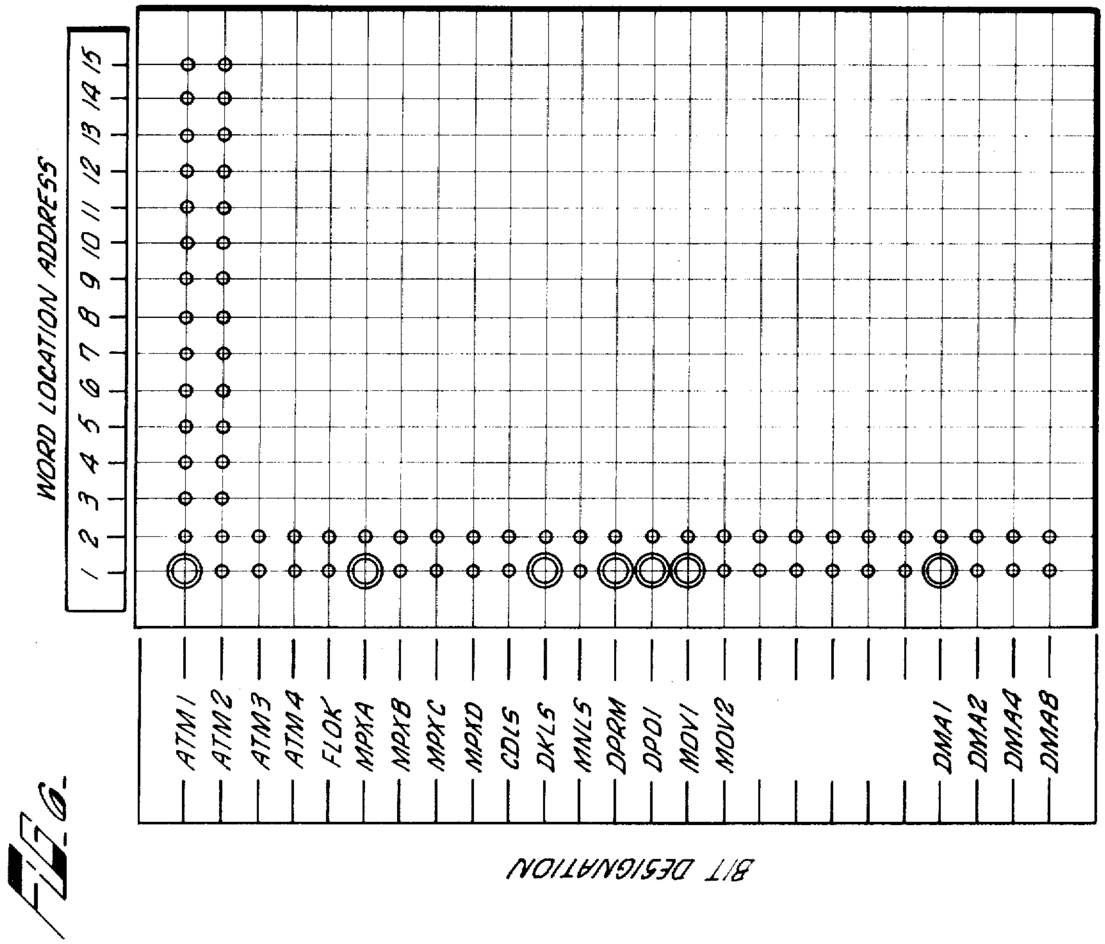
FIG. 6 is a diagram illustrating a programmable read-only memory whereby the respective units in a processing group can be designated for different functions by plurality of different designation words which are stored in that memory.

The manner in which designation memory 35 specifies the functional designations of the various units in a particular processing group and accommodates the redesignation of such functions so as to reconfigure the units of the processing group and of a subsystem will now be described in relation to FIG. 6 which is a plan view of the face of a pin board read only memory. Because of the manner in which the pin board face is oriented in FIG. 6, the respective columns represent different reconfiguration control words that may be stepped through in sequence in response to distress signals sensed by the various redesignator units. The respective rows represent the functional characteristics that may be designated for the particular processing groups represented by this section of the designation memory and also the functional characteristics of the particular units in that processing group. As is indicated in FIG. 3, designation memory 35 is divided into a number of sections one for each of the respective processing groups. FIG. 6 illustrates one section of memory 35 which section contains the reconfiguration control words for one processing group.

The four top locations in each of the reconfiguration control words provide for designation of up to four different subsystems into which a multiprocessing system can be partitioned as was described above. As indicated in the first reconfiguration control word of the memory in FIG. 6, the processing group represented by this section of the designation memory has been designated to be in subsystem number 1 represented by the location ATM 1. The next designation position in the reconfiguration control word is the FLOK position which indicates whether or not the subsystem to which the group has been designed is to operate in the permissive mode which will be further discussed below. In the illustration of FIG. 6, that mode has not been designated.

Continuing down the column the next four pin positions designate whether or not the I/0 control unit of the present processing group is to receive the functional designation of MPXA, . . . MPXD. In the present illustration the I/0 control unit of the current processing group is designated as MPXA. It will be noted from the format of the word location addresses, that the current I/0 control unit could be designated for the function of MPXB by the second reconfiguration control word and so forth. Conversely, an I/0 control unit of another processing group would be designated for the MPXB function in reconfiguration control word number 1 and as MPXA function in reconfiguration control word number 2.

Proceeding on down the column, the next three positions respectively allow for specification of the loading of the MCP during a halt/load operation from a card reader (CDLS), a disk (DKLS) or manual load (MNLS). These specifications are relevant only when the system is in a dynamic mode. When manual select (MNLS) has been specified, the load operation is not automatically initiated. As indicated in the illustration of FIG. 6, the disk load select position has been specified for the reconfiguration control word number 1.

Continuing down the column, the next two positions specify respectively that the data processor in the present processing group is ordered to accommodate on-line operations (DPRM) and that the data processor of the present processing group is designated to be the number 1 processor in the present subsystem of processing groups (DPO1) which processor is the one that is active at load time. In the illustration of FIG. 6, the data processor of the present processing group has been specified to be both on-line and the number 1 processor.

The next two positions in the columns, MOV1, MOV2 respectively specify which of two memory modules are subject to identification override control by signals from the designation memory. In the illustration of FIG. 6, memory module number 1 is subject to identification override.

The next five positions in the column are reserved for other use and the last four positions at the bottom of the column (DMA1, . . . DMA8) are bit positions which may be combined to specify the address of the current designation memory word. In the illustration of FIG. 6, only the first bit position of that address has been specified indicating word location address number 1. In the second word the second bit position would be indicated to indicate word location number 2. In this manner, word addresses could be specified out of sequence in relation to the physical locations on the pin board face of designation memory.

In addition, other designations may be specified outside of the designation memory by switches mounted in the reconfiguration control unit. For example, as was indicated in FIG. 1, there are two operator consoles provided for the system. In a typical embodiment of the present invention, the system would be adapted for operation as two subsystems which may be designated A or B (as was illustrated in in FIG. 2) and the appropriate switch on the reconfiguration control unit panel control would be used to specify which of the consoles is connected to provide operator control for sybsytem A and which was adapted to provide operator control for subsystem B.

Figures 3, 8:
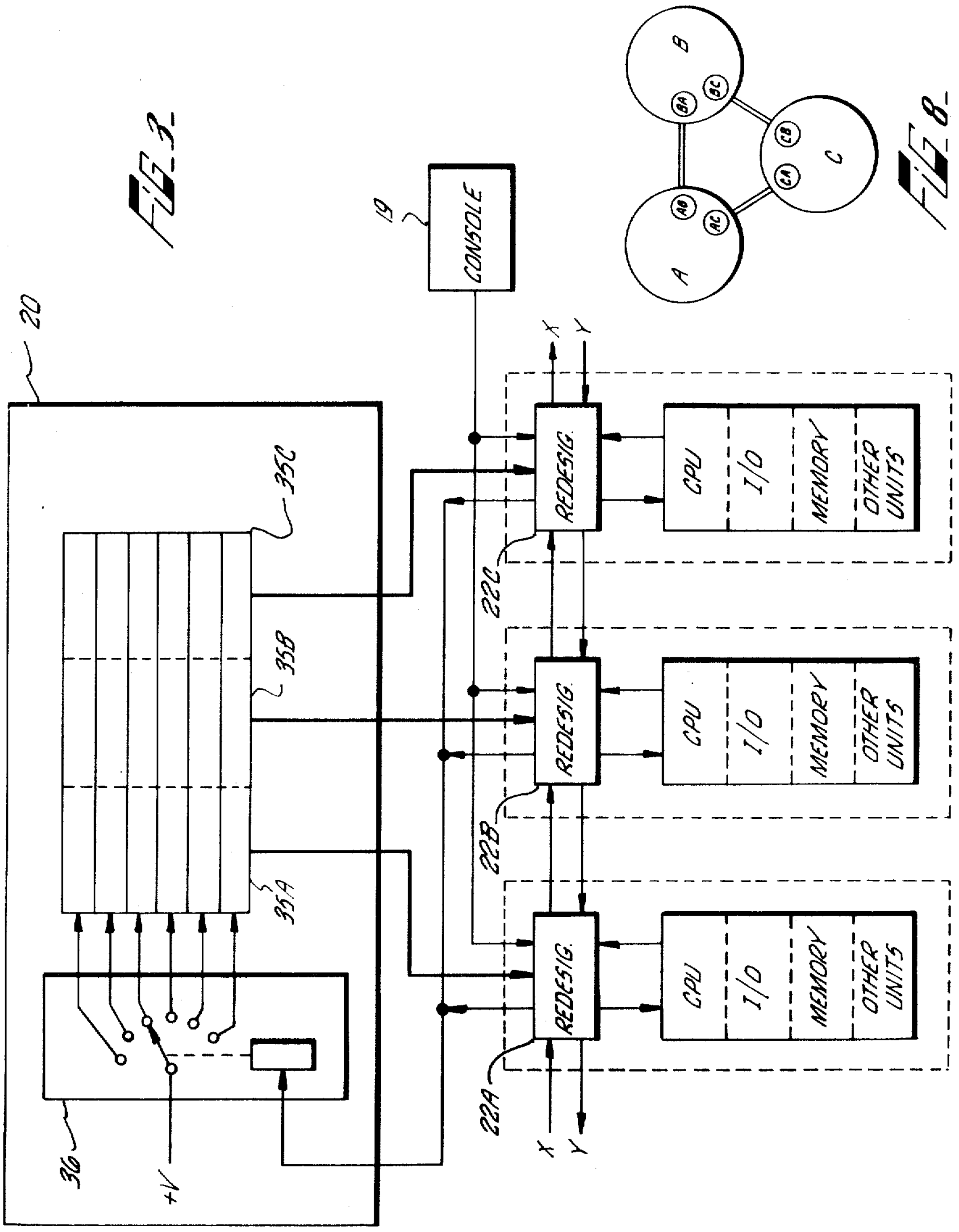
FIG. 3 is a schematic diagram illustrating a reconfiguration control unit of the type illustrated in FIG. 1 and the manner in which it communicates with redesignator units representing each of the processing groups.
FIG. 8 is a diagram illustrating the interconnection of different subsystems in a permissive mode.

The redesignator units 22A, 22B, 22C of FIG. 3 are the intermediary units between the reconfiguration control unit and the units of the particular processing groups. Each group is represented by a redesignator unit which also handles communication between an operator's console and maintenance and diagnostic processor in that group. The redesignator unit is also the communications agent for inter-group coupling. More specifically, the redesignator unit performs four major functions. It forwards unit designations from the reconfiguration control unit to the units of its processing group and verifies that the assignments are proper and mutually consistent among the units in a subsystem to which the processing group has been assigned. The redesignator unit selectively exchanges operating signals with other redesignator units to coordinate the joint operation of two or more processing groups in a subsystem. As was indicated above, the redesignator unit detects distress conditions in its own processing group or in its linking arrangements with other redesignator units and gives notification of such conditions. Finally, the redesignator unit reacts to distress conditions by ordering halt-load operations including a system reconfiguration under the direction of the reconfiguration control unit in attempts to restore at least partial system operation.

Figure 7:
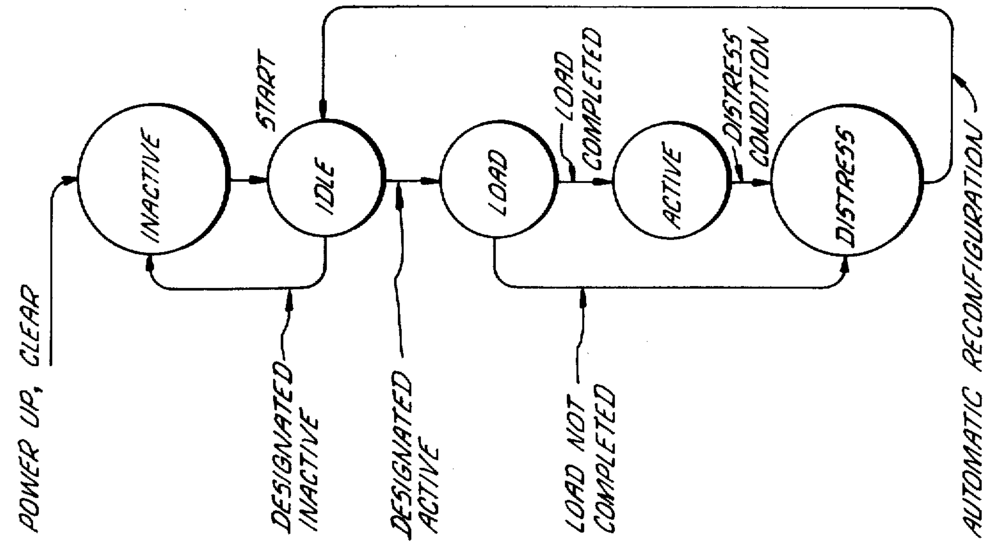
FIG. 7 is a flow diagram illustrating the operational steps of the redesignator unit.

The sequence of operations initiated and controlled by the redesignator unit are illustrated in FIG. 7 which is a flow diagram of that sequence. These operations may be described in terms of five basic states.

When a processing group is not operating, its redesignator is in the inactive state and can respond only to manually initiated load signals or activate signals from another redesignator unit. The redesignator unit will stay in the inactive state until it is changed to the idle state in response to such signals. A manually initiated load signal or an activate signal always establish the idle state regardless of what state the redesignator unit is in. The inactive state is established by power turn on or a system, group, or local clear signal. It is also set at start time when the redesignator unit is not designated as active.

In the idle state, the redesignator unit interfaces are open, the redesignator unit may accept designation signals from the reconfiguration control unit at which time redesignator unit linkage with other redesignator units is determined. The processing group represented by the redesignator unit is in a halted condition when the unit is in this state. When the multiprocessing system is in a dynamic mode, the idle state follows a distress state after system reconfiguration is ordered. The same action occurs when the redesignator unit is activated from an inactive state by an activate signal issued by some other redesignator unit which has a distress condition. The idle state is terminated by an automatic load command following a 200 millesecond delay when system reconfiguration is ordered. If no automatic load command is issued, a manually initiated load signal must be received. The idle state can also be terminated by the operator.

In the load state, a redesignator unit normally issues a load signal and waits until the load cycle is successfully completed. The load sequence includes the following steps: a delay for load-time synchronization with other redesignator units in an assigned subsystem, transmission of selective clear signals to the data processor and I/O control unit of the current processing group if they have been placed in the on-line status, activation of the distress sensing units and checking of the redesignator unit linkage and data processor and I/O designations, transmission of a load signal (unless a distress condition already exists), delay for an indication that the load operation has been successfully completed. The redesignator unit then enters the active state unless a distress state (to be discussed below) has already been established.

The active state is the normal state of the redesignator unit when its processing group is operating. All designation information is fixed and distress sensing is enabled. The active states exist until the distress or manual intervention occurs.

The distress state is established by the detection of a distress condition which condition can be detected in either the active state or the load state after distress sensing has been enabled. When a distress condition has been detected, the redesignator unit issues a halt signal to stop the operation of the data processor in the present processing group. This action is normally followed by cessation of all system operation. The redesignator unit then initiates the following steps to effect a new system configuration: delay for halt-time synchronization among redesignator units which is obtained when all redesignator units of the same subsystem recognize the system halt condition, transmission of a step signal to the reconfiguration control unit to call for a new system configuration, transmission of an activate signal to activate any inactive redesignator unit of the same subsystem so as to accommodate any forthcoming new system configuration, and entering into the idle state after which the above-described sequence is then repeated as required.

Figure 4:
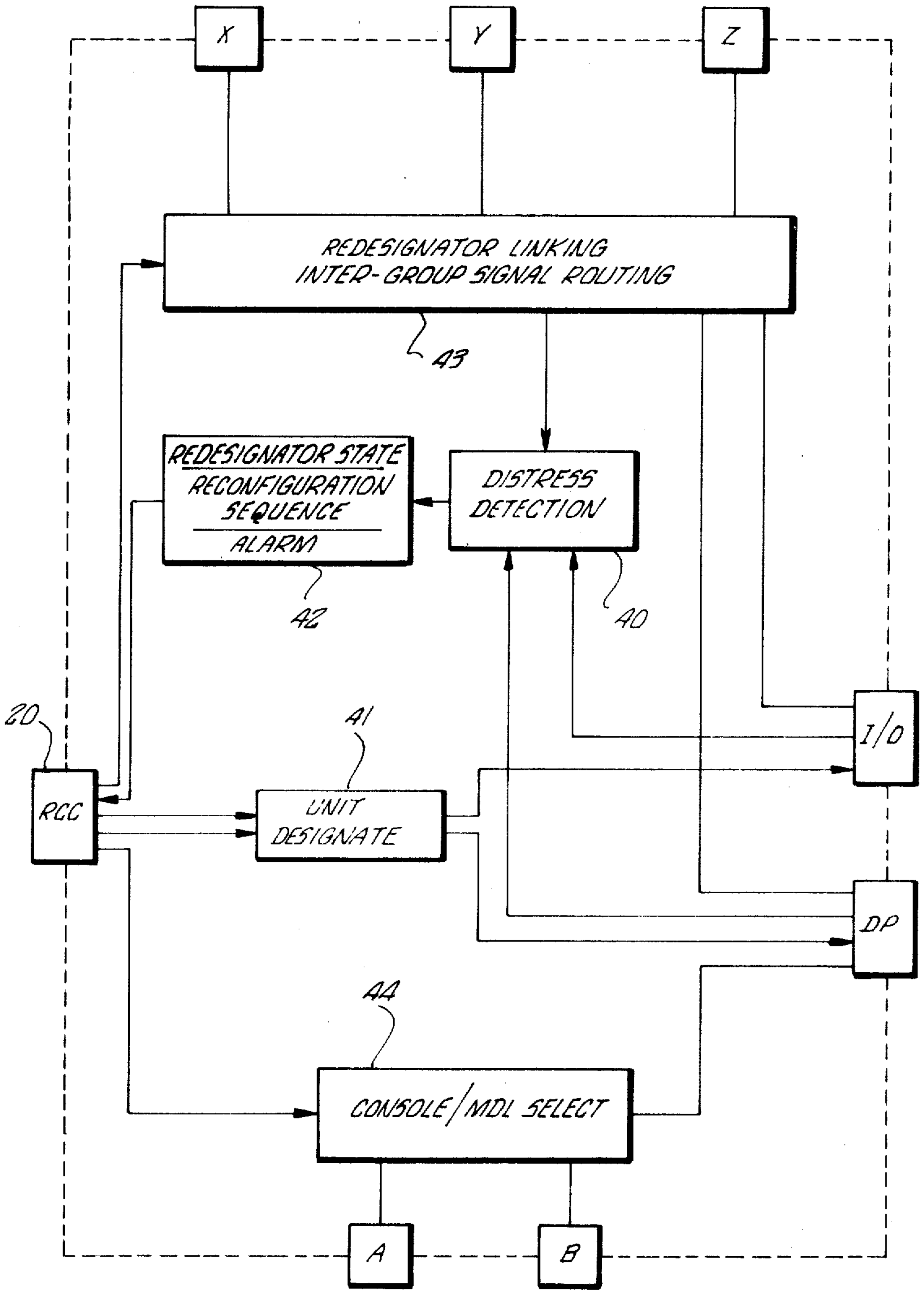
FIG. 4 is a schematic diagram of an individual redesignator unit.

As indicated in FIG. 3, each redesignator unit is coupled to the various units in the processing group which that redesignator represents and the respective redesignator units are also coupled to each other. That is to say, redesignator unit 22A is coupled to both redesignator units 22B and 22C and so forth. A schematic diagram of the redesignator unit itself is illustrated in FIG. 4. As indicated therein, failures or distress conditions in the data processor or in the I/O control unit are sensed by the distress detection unit 40 which unit comprises a plurality of flip-flops that are set in accordance to conditions in the processor and I/O control unit and in turn initiates a halt of system operations. Reconfiguration sequencing unit 42 comprises a multivibrator that is triggered by distress detection unit 40 to send the appropriate stepping signals to the reconfiguration control unit as was indicated in the discussion of FIG. 3. Typical distress conditions which may exist within the processing group include a recursive interrupt in the data processor, a maximum specified count of successive unsuccessful halt/load operations, a power failure in one of the group units and an apparent loss of scan control bit.

In addition, the distress detection unit 40 is also adapted to sense improper system configuration code assignments with other processing groups and also unsuccessful linkages with other properly assigned subsystem groups. Such distresses are signaled to the distress detection unit 40 by redesignator linking and checking unit 43. Redesignator linking and checking unit 43 is more thoroughly illustrated in FIG. 5. Each redesignator unit seeks a left neighbor and a right neighbor, using "scan bus group" bits from a plug board in the scan bus configuration control unit and also employs "designated as active" bits from the designation memory in the reconfiguration control unit. "Left neighbor" and "right neighbor" signals are mutually exchanged among the redesignator units. A valid link is established if and only if a redesignator's transmitted signals are marked by complementary received signals; that is, a hub determined to be a left hub must be matched with a hub which identifies itself as a right hub, and vice versa. Once established, the left-right linkage is continually monitored. Any failure or interruption of the linkage is a system distress condition and will be appropriately detected. Power failure in one sub-system group is sensed as a linkage distress in other redesignator units.

Intergroup signals are exchanged between redesignator units as required by way of the interconnections described above. The intergroup signals are logically controlled and routed in accordance with the specified system configuration which can be dynamically changed if a distress condition occurs.

A particular use of the signal routing among processing groups is the management of the scan control signals. The data processors in the system must circulate these signals among themselves to prevent a conflict in the use of the scan bus and to regulate the acceptance of external interrupts. For these signals, each processor is provided with a "scan control-output" hub and a "scan control-input" hub, each with five signal leads. In a system without redesignator units, intercommunication among processors is provided by cables that link the processors in a closed series loop. If there is only one processor, its output hub is coupled to its input hub. The system is inoperative if the linkage is broken. With the redesignator units, a processor's scan control leads are connected to the group's redesignator unit and the required series link for the scan control signals is established by assigned "output" and "input" directions to the inter-redesignator unit signals in a way that simulates the desired physical linkage. If one series linkage cannot be closed, another linkage path can be provided dynamically.

As was indicated above, each redesignator unit receives four bits from scan bus configuration unit by way of the reconfiguration control unit which bits describe the particular processing groups that are active members in a particular sub-system configuration. One bit gives the state of the particular redesignator unit and the other three bits refer to the other redesignator units to be employed in the particular configuration. Using these bits in conjunction with other information defining the relative condition of the redesignator, the redesignator unit determines its left and right neighbors in the active system configuration.

Referring again to FIG. 4, the four bits received from the scan bus configuration unit are supplied to the link control and checking unit 43 to establish an interlock with the other redesignator units in a manner that will be more fully described below. In addition, the redesignator unit is provided with a MDL selection unit 44 which is a switching network that receives signals from both of the maintenance and diagnostic logic (MDL) processors in the system for halt/load selection and to route that inquiry to the data processor of the particular processing group served by the redesignator unit.

Before describing the interface between two redesignator units, the permissive mode of joinder between processing groups assigned to the same sub-system will now be discussed in relation to FIG. 8 of the drawings. The multiprocessing system as described so far comprises a plurality of processing groups which can be partitioned into two or more sub-systems with each sub-system comprising one or more processing groups. Signals representing a system configuration code are generated by scan bus configuration unit 23 of FIG. 1 and are transmitted to the various redesignator units 22A, 22B by way of the reconfiguration control unit 20. These system configuration codes represent the status indicative of the manner in which the various scan buses of 18A, 18B of the various processing groups are connected together by the plug board of scan bus configuration unit 23. In the system that has been described so far, the unavailability of a particular processing group to join the sub-system to which it has been so designated would result in a distress condition that would cause one of the redesignator units to signal for a new system configuration. Such unavailability of a processing group could result from that processing group having been designated into a "local" mode. For the purpose of distinction, the mode of joining different processing groups to a sub-system as has thus far been described will be defined as the imperative mode of joinder.

The permissive mode of joinder distinguishes from the imperative mode in that, when the permissive mode has been designated, the various processing groups for the designated sub-system will join or interconnect with only those available processing groups which have been designated for the particular sub-system. As illustrated in FIG. 8 each of the redesignator units A, B, C is physically connected to every other redesignator unit, but is provided with the ability to selectively enable or disable signal transfer paths to or from each other redesignator unit. The connection interface at any unit is referred to as a hub. To transmit signals through an interconnecting cable, the hub controls at both ends of that cable must be activated. For example, to open a signal transfer path between redesignator units A and B, hub AB of redesignator A must be activated and hub BA of redesignator B must be activated. Such a transfer path is required if the processing groups represented by redesignators A and B are to cooperate as a sub-system. If all three processing groups are to be a part of this same sub-system, then all of the hub controls (two in each redesignator unit) must be activated.

As was described above in regard to the imperative mode, the scan bus configuration unit is a passive supervisor that constrains the manner in which the different processing groups can be joined together into subsystems, while the reconfiguration control unit is the active supervisor. These supervisory units transmit a sub-system configuration code to the redesignator units of each of the processing groups. By means of direct communication paths among the redesignator units, each unit transmits it own system configuration code to all other redesignator units and receives a system configuration code from all other redesignator units. If the respective system configuration codes match, a flip-flop in each of the units is set as will be more thoroughly described below. This establishes the communication link between the processing groups for the exchange of intergroup operating signals. If the respective system configuration codes do not match, each redesignator unit will recognize that the interconnection is invalid. If a particular processing group is in a "local" condition or if its power is down, it will not transmit its system configuration code to the other groups and, thus, will not be recognized by the other processing groups designated for the subsystem. Thus, the subsystem may form itself permissively, with only the viable groups as active members.

Figure 5:
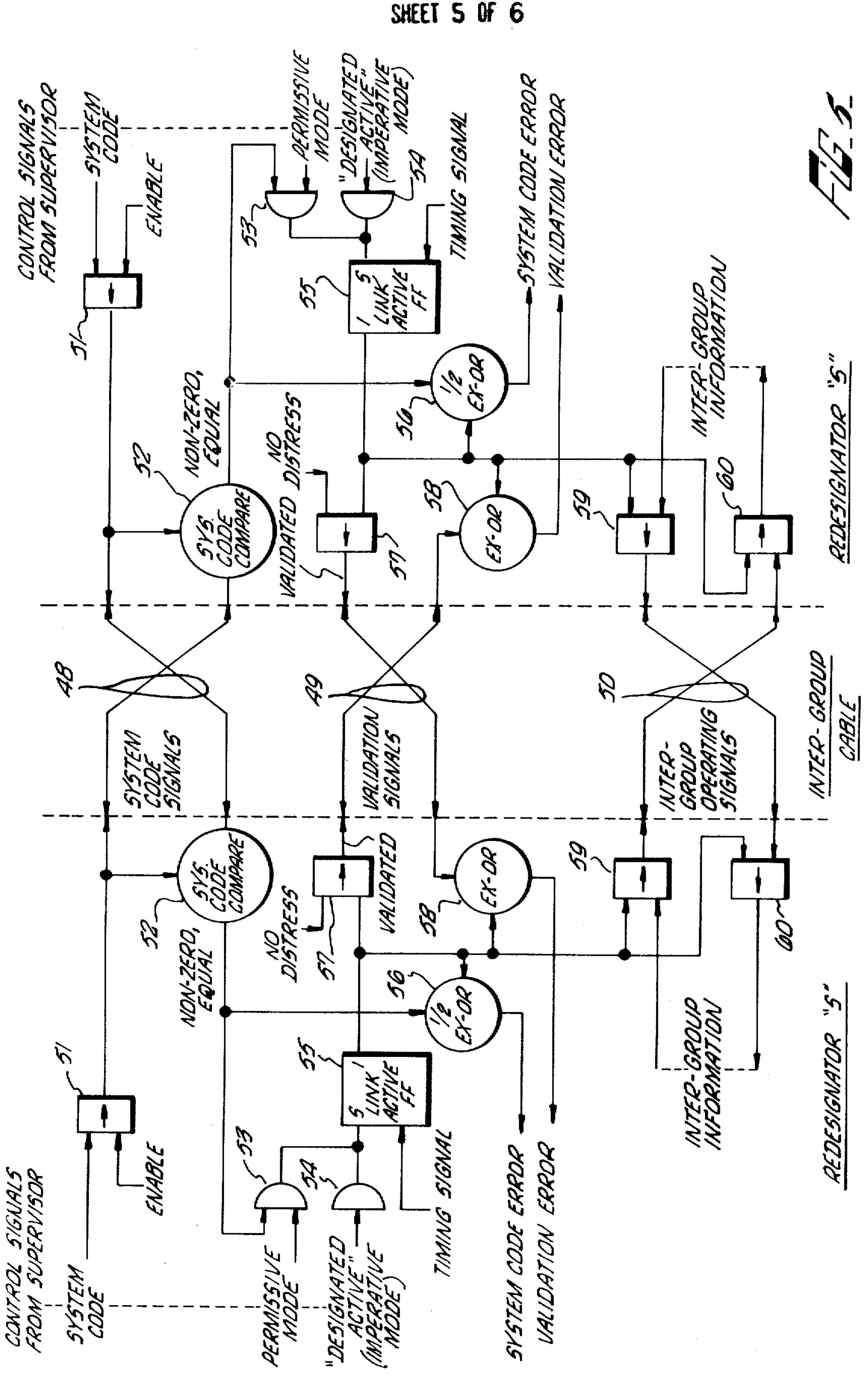
FIG. 5 is a diagram illustrating the interface between two redesignator units.

As illustrated in FIG. 5, the interface between two redesignator units includes the cabling to connect corresponding hubs in the respective redesignator units. Such hubs are a part of the link control and checking unit 43 of the redesignator as illustrated in FIG. 4. It will be understood that each redesignator will be provided with a number of such hubs corresponding to the number of other redesignator units in the multiprocessing system. As was indicated above, each redesignator unit is coupled to every other redesignator unit in the system. The interface includes three sets of leads which are the system code signal leads 48, validation signal leads 49 and intergroup operating signal leads 50. Each set includes two leads for transmission in opposite directions.

As illustrated in FIG. 5, each hub includes a series of enable gates 51 to transmit a system configuration code which is received from the scan bus configuration unit. A signal received from the reconfiguration control unit defines whether a permissive mode or imperative mode is called for. A corresponding system configuration code is received across the interface by system code comparator 52. If a permissive mode is called for, the signal indicating that the respective system codes do compare is transmitted by way of AND gate 53 to set link active flip-flop 55. In the imperative mode, link active flip-flop 55 may be set by a designated active signal from gate 54. When the link active flip-flop 55 has been set and there is no distress signal received from distress detection unit 40 (see FIG. 4), a validation signal is transmitted across the interface to the other redesignator by way of AND gate 57. That validation signal is received by exclusive OR circuit 58 to generate a validation error signal when either no validation signal is received from the other redesignator unit or when link active flip-flop 55 of this redesignator unit has not been set. When link active flip-flop 55 has been set and an improper system code signal has been detected by comparator 53, this will cause NAND gate 56 to generate a system code error. When a proper system code comparison has been achieved and appropriate validation signals are received from the other redesignator, driver circuits 59 will be enabled to transmit intergroup operating signals and receiver circuits 60 will be enabled to receive intergroup operating signals from the other redesignator.

An error situation would exist if there is not a proper comparison between a transmitted system configuration code and a received system configuration code called a validation error. The validation signal received from the other redesignator is compared with the output of the link activate flip-flop. If there is no comparison, the validation error generates a distress condition which causes the redesignator's own transmitted validation signal to be discontinued. That is to say, a validation error will create a distress condition and vice versa. The absence of an expected validation signal from another redesignator unit then will result in a termination of the present system configuration through the usual actions taken in response to distress conditions.

Inherent in the permissive mode, is the characteristic that all processing groups assigned a system configuration code need not be joined into that configuration. If a particular group is in a "local" condition, or if its power is down, it does not transmit its code to the other groups. As a result, the other groups assigned to the configuration do not recognize the unavailable group. It is in this sense, that the mode is permissive in that the system configuration is formed with only the viable groups as active members.

In the imperative mode, the system configuration codes have a different significance than in the permissive mode. Those configuration codes indicate how the various processing groups are physically interconnected by the scan bus configuration unit. The intergroup connections imperatively ordered can only be made within the framework allowed by the system configuration codes.

PROGRAM RECONFIGURATION PROCEDURES

Decommitment of Resources

The operator may request the MCP to remove a resource from the system. The MCP will schedule the resource to be decommitted as soon as it is no longer in use and providing the resource is not required to maintain an operation configuration.

The availability of a resource for decommitment is as follows:

1. Peripheral — at the end of its connection to a job — i.e., at file close time.
2. I/0 Processors — at end of all logical data transfers in process. As peripheral units become idle, the MCP makes no attempt to initiate I/0 operations on a unit associated within an I/0 Processor marked for decommitment. TOD clocks in both IOP's are synchronized, thus either IOP can be decommitted without disrupting system operation.
3. Data Processor — immediately marked unavailable — any subsequent attempt to use this resource is inhibited.
4. Memory Module — on completion of all work currently in process using space within the module.

Decommitment is accomplished by removing the unit from the list of resources available to the system. A SPO Message will inform the operator when a resource has been decommitted. In the case of data processors and I/0 processors, the operator must then place the device in local mode. No HALT/LOAD is required when decommitting a resource from the system. A HALT/LOAD operation does not change the current status (local/remote) of a system resource. Software decommitment of resources will be subordinate to hardware and/or hardware-operator action described elsewhere in this specification.

Reinstatement of Resources

The operator may request a resource to be reinstated to the active system via a SPO message. In the case of data processors and I/0 processors, further instructions will be given to the operator via the SPO, and his compliance will cause the unit to become ready. Other units will be re-instated to the system as soon as they are switched to Remote. A HALT/LOAD operation is not required to reinstate resources under normal conditions.

The operator also may elect to return a resource to the active system by initiating the following actions:

1. HALT the system;
2. place resource in remote mode;
3. LOAD the active system.

If a resource, although resinstated, is not a part of the current configuration (as defined by ROM) it will not be available for use by the active system.

On-Line Maintenance System

The On-Line Maintenance System consists of two facilities to aid in maintaining system confidence:

1. A set of MCP built-in confidence test routines to test certain system resources;
2. A control language intended for the use of a field engineer to perform specific tests on the unit while adjustments and alignments are made.

Peripheral Confidence Test

The MCP routines are designed to check high-speed peripheral devices (disk and tape) on the system at the request of the operator. Although the routines will only be run with operator permission, the MCP will accumulate statistics and will request permission to run confidence routines on those devices which appear questionable. In this manner, a system resource which will be imminently required by a user program will not be pre-emptively seized by the Maintenance System.

Memory Module Confidence Tests

During the initialization procedures of the MCP following a HALT/LOAD, tests will be run on all modules other than module zero (which is in use by the confidence tests) which are found to be on-line. The module will be linked into the memory resource chain if it passes the following tests:

1. Memory Address Register Check

Zero will be stored in locations 0 and 3FFF of the module. Locations $2^0, 2^1, \ldots, 2^{13}$ will be written with the values $2^0, 2^1, 2^2, \ldots 2^{13}$ respectively. Since all addresses used contain only a single bit, location 0 will contain a value indicating any stuck-at-zero address line. The complement of these values will be written into complemented locations and location 3FFF will similarly contain a value indicating any stuck-at-one line.

2. Write Ones/Zeros Test

Selected words of the module will be written with bit patterns of all ones and then of all zeros to verify correct action.

3. A more comprehensive test of any failing module will be run on request after initialization is completed and the results of this test will be reported via an SPO message.

Dynamic Halt/Load

Under some circumstances it is possible for an error to occur from which the MCP cannot recover. Examples of such errors include undetected transient failures or invalid operators occurring in the MCP due to undetected erroneous information transfer when reading MCP code segments from disk. In such circumstances the MCP will attempt to recover by simulating a halt/load sequence. This action allows dynamic recovery from the majority of transient system failures.

Duplicated Files

One of the software features provided is called "duplicated files." This term is applicable to on-line disk files which must be protected from system failure.

Just as there is a duplicate directory such that the system can HALT/LOAD using the alternate copy, the software can be directed to maintain files in a duplicate fashion such that the "copy" data will automatically be utilized if the "original" data cannot be sucessfully acquired.

If the software detects an error in either the "original" or "copy," the user program is given the data from the "good" source and is notified in order that recovery/reconstruction methods can commence. Reconstruction will occur only when invoked by the user program. Normal library maintenance facilities can be used to copy the duplicate file(s) to or from tape.

Since a "copy" of the "original" is always available (except during recovery/reconstruction), the system will require twice the disk capacity necessary to hold only the "original." Furthermore, In order to maintain reasonable throughput and still maintain duplicate files, the disk speed should be equivalent. In providing "safe" duplication, the user can assist in locating the positions of the "original" data as well as the "copy" data.

EPILOGUE

A multiprocessing system has been disclosed which is adapted to provide continuous data processing capabilities through the appropriate management of its resources at both the functional unit and sub-system levels. The system includes a plurality of processing groups each of which includes a processing unit, a memory module, and an I/0 control unit. The respective groups can be partitioned into independent subsystems, each of which includes one or more processing groups, or can be arranged as a single multiprocessing system. Within the sub-systems thus established, similar like units can be designated for different functional tasks or particular like units can be disengaged from the system in response to the detection of a malfunction in any particular unit. In this sense, the respective sub-systems or the multiprocessing system itself can be sequenced through a number of different configurations of functional units were each particular functional configuration is adapted to correct for particular types of unit malfunctions. This in turn accomodates maintenance and diagnostic procedures to be run on a particular failed unit, and other units associated therewith, while providing reduced but nevertheless acceptable data processing capabilities.

While finite number of embodiments of the present invention have been particularly disclosed and described, it will be understood by those skilled in the art that variations and modifications may be made therein without departing from the spirit and scope of the invention as claimed.

What is claimed is:

1. A processing system having a processing unit, a memory unit to store a master control program, and an I/0 control unit, said master control program being adapted for use by said processing unit to control system operations, said system comprising:

a reconfiguration control means;

sensing means coupled to each of said units to sense a malfunction in a unit of the system;

first transmission means coupled to said sensing means and to said processing and I/0 units for halting the current operation of the system in response to a sensed malfunction;

said first transmission means being coupled to said reconfiguration control means to transmit a signal to said reconfiguration control means in response to said sensed malfunction to call for a redesignation of functions of the units in said system; and second transmission means in said reconfiguration control means and coupled to said processing and I/0 units to transmit signals to said units to redesignate functions of said units in said system;

said first transmission means being responsive to said second transmission means to signal reinitiation of system operation;

said I/0 control unit being responsive to said operation reinitiation to load a new copy of the master control program into said memory unit.

2. A data processing system according to claim 1 wherein:

said reconfiguration control means includes means to generate signals designating particular functional tasks for said units in said system.

3. A data processing system according to claim 1 wherein:

said reconfiguration control means includes means to generate signals representing an interchange of functions of said units in said system.

4. A data processing system according to claim 1 wherein:

said reconfiguration control means includes means to generate signals representing the same functional tasks for the respective units as previously designated so as to effect a retry of the previously designated function.

5. A multiprocessing system having a plurality of processing groups, each group including a processing unit, a memory unit to store a master control program and an I/0 control unit, said master control program being adapted for use by said processing unit to control system operations, said system comprising:

a reconfiguration control means;

a plurality of sensing means, one for each processing group, each sensing means being coupled to each unit of its respective group to sense a malfunction in a unit;

first transmission means coupled to said plurality of sensing means and to said processing and I/0 units for halting the current operation of the system in response to a sensed malfunction;

said first transmission means being coupled to said reconfiguration control means to transmit a signal to said reconfiguration control means in response to said sensed malfunction to call for a redesignation of functions of the units in said processing groups; and second transmission means in said reconfiguration control means and coupled to said processing and I/0 units to transmit signals to said processing groups to redesignate functions of said units in said system;

said first transmission means being responsive to said second transmission means to signal reinitiation of system operation;

one of said I/0 control units being responsive to said operation reinitiation to load a new copy of the master control program into one of said memory units.

6. A data processing system according to claim 1 wherein:

said reconfiguration control means includes means to generate signals designating particular functional tasks for said units in said processing groups.

7. A data processing system according to claim 1 wherein:

said reconfiguration control means includes means to generate signals representing an interchange of functions of said units in said processing groups.

8. A data processing system according to claim 1 wherein:

said reconfiguration control means includes means to generate signals representing the same functional tasks for the respective units as previously designated so as to effect a retry of the previously designated function.

9. In a data processing system having a reconfiguration control unit, a processing unit, a memory unit to store a master control program and an I/0 control unit, said master control program being adapted for use by said processing unit to control system operations, the method comprising:

sensing a malfunction in a unit of said system;

halting the current operation of the system in response to said sensed malfunction;

transmitting a signal to said reconfiguration control unit in response to said sensed malfunction;

transmitting signals from said reconfiguration control unit to the other units of said system to redesignate functions of said units in said system;

reinitiating system operation; and loading a new copy of the master control program into said memory unit.

10. In a multiprocessing system having a reconfiguration control unit and a plurality of processing groups, each group including a processing unit, a memory unit to store a master control program and an I/0 control unit, said master control program being adapted for use by said processing unit to control system operations, the method comprising:

sensing a malfunction in a unit of said system;

halting the current operation of the system in response to said sensed malfunction;

transmitting a signal to said reconfiguration control unit in response to said sensed malfunction;

transmitting signals from said reconfiguration control unit to said processing groups to redesignate functions of said units in said system;

reinitiating system operation; and loading a new copy of the master control program into said memory unit.

* * * * *

UNITED STATES PATENT OFFICE
CERTIFICATE OF CORRECTION

Patent No. 3,787,816 Dated January 22, 1974

Inventor(s) Erwin A. Hauck, et al

It is certified that error appears in the above-identified patent and that said Letters Patent are hereby corrected as shown below:

Col. 1, line 39, "by" should read --be--.

Col. 18, line 37, "particular like units" should read --particular units--.

line 42, "were" should read --where--.

line 44, "accomodates" should read --accommodates--.

Signed and sealed this 14th day of May 1974.

(SEAL)
Attest:

EDWARD M.FLETCHER,JR.
Attesting Officer

C. MARSHALL DANN
Commissioner of Patents